United States Patent
Nesbitt et al.

(10) Patent No.: US 7,865,562 B2
(45) Date of Patent: Jan. 4, 2011

(54) SELECTING EMAIL SIGNATURES

(75) Inventors: Pamela A. Nesbitt, Tampa, FL (US); Lisa A. Seacat, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 196 days.

(21) Appl. No.: 12/123,929

(22) Filed: May 20, 2008

(65) Prior Publication Data

US 2009/0292776 A1    Nov. 26, 2009

(51) Int. Cl.
G06F 15/16   (2006.01)
G06F 17/21   (2006.01)

(52) U.S. Cl. ..................... 709/206; 715/232

(58) Field of Classification Search ......... 709/204–207; 715/230, 232, 253, 268
See application file for complete search history.

(56) References Cited

U.S. PATENT DOCUMENTS

| | | | |
|---|---|---|---|
| 6,385,627 B1* | 5/2002 | Cragun | 715/273 |
| 6,507,865 B1* | 1/2003 | Hanson et al. | 705/36 R |
| 6,510,453 B1* | 1/2003 | Apfel et al. | 709/206 |
| 6,526,436 B1* | 2/2003 | Shiraishi et al. | 709/206 |
| 6,983,309 B1* | 1/2006 | Yoshizawa | 709/206 |
| 2006/0161780 A1* | 7/2006 | Berryman et al. | 713/176 |
| 2008/0040435 A1* | 2/2008 | Buschi et al. | 709/206 |

OTHER PUBLICATIONS

Microsoft Exchange, "Exclaimer Mail Utilities", http://www.exclaimer.com/mailutilities.aspx,(2008), 1-7.

* cited by examiner

*Primary Examiner*—Wing F Chan
*Assistant Examiner*—Jonathan Willis
(74) *Attorney, Agent, or Firm*—DeLizio Gilliam, PLLC

(57) ABSTRACT

In some embodiments, a method comprises detecting a request to append a signature to an outgoing email, wherein the outgoing email is addressed from a sender to a recipient. A plurality of email signature rules for the sender is accessed. At least one of a condition and a property associated with the outgoing email are evaluated against the plurality of email signature rules. It is determined that at least two of the plurality of email signature rules are satisfied based on evaluating at least one of the condition and the property associated with the outgoing mail against the plurality of email signature rules. A plurality of email signatures is identified from a list of email signatures based, at least in part, on the at least two email signature rules that are satisfied. A composite signature is generated with the plurality of email signatures.

20 Claims, 4 Drawing Sheets

SELECTING EMAIL SIGNATURES

TECHNICAL FIELD

Embodiments of the inventive subject matter generally relate to the field of email clients and networks, and, more particularly, to techniques to automatically choose the appropriate electronic signature based on the message context.

BACKGROUND

Email "signatures" provide a quick and convenient means to automatically append text to the end of an email. Typically, when an email program's signature feature is enabled, the email program will automatically append the user's signature to the email text, eliminating any need for the user to type the signature text. Many email programs will automatically append signatures before transmission. Typically, users can activate an email program's signature feature by providing signature text and turning on a signature setting (e.g., in a graphical user interface). Signature text often includes the email sender's contact information, legal disclaimers, noteworthy quotations, etc.

SUMMARY

In some embodiments, a method comprises detecting a request to append a signature to an outgoing email, wherein the outgoing email is addressed from a sender to a recipient. A plurality of email signature rules for the sender is accessed. At least one of a condition and a property associated with the outgoing email against the plurality of email signature rules is evaluated. It is determined that at least two of the plurality of email signature rules are satisfied based on evaluating the at least one of the condition and the property associated with the outgoing mail against the plurality of email signature rules. A plurality of email signatures is identified from a list of email signatures based, at least in part, on the at least two email signature rules that are satisfied. A composite signature is generated with the plurality of email signatures.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

Appending signatures to emails is a very common practice. Many individuals save email signatures that are automatically attached whenever they create a new message. Email signatures provide users with a quick and convenient means to append contact information or any other information they want to share with recipients. However, a user may want to change signatures depending on the target audience and/or the content of the message. Users may wish to append different signatures based on the time of day, on special events, on holidays, etc. For example, users may want to append one signature for emails sent during work hours and another signature for emails sent in the evening. Also, when sending the same email to a group of people, users may want to append different signatures for different recipients. Some embodiments of the inventive subject matter enable users to automatically append signatures to emails based on a set of user-defined rules. Some embodiments provide an intelligent, user-configurable system that uses contextual cues to select signatures for emails.

Example Operating Environments

This section describes example operating environments and provides structural aspects of some embodiments.

Client-Server System

Figure 1:
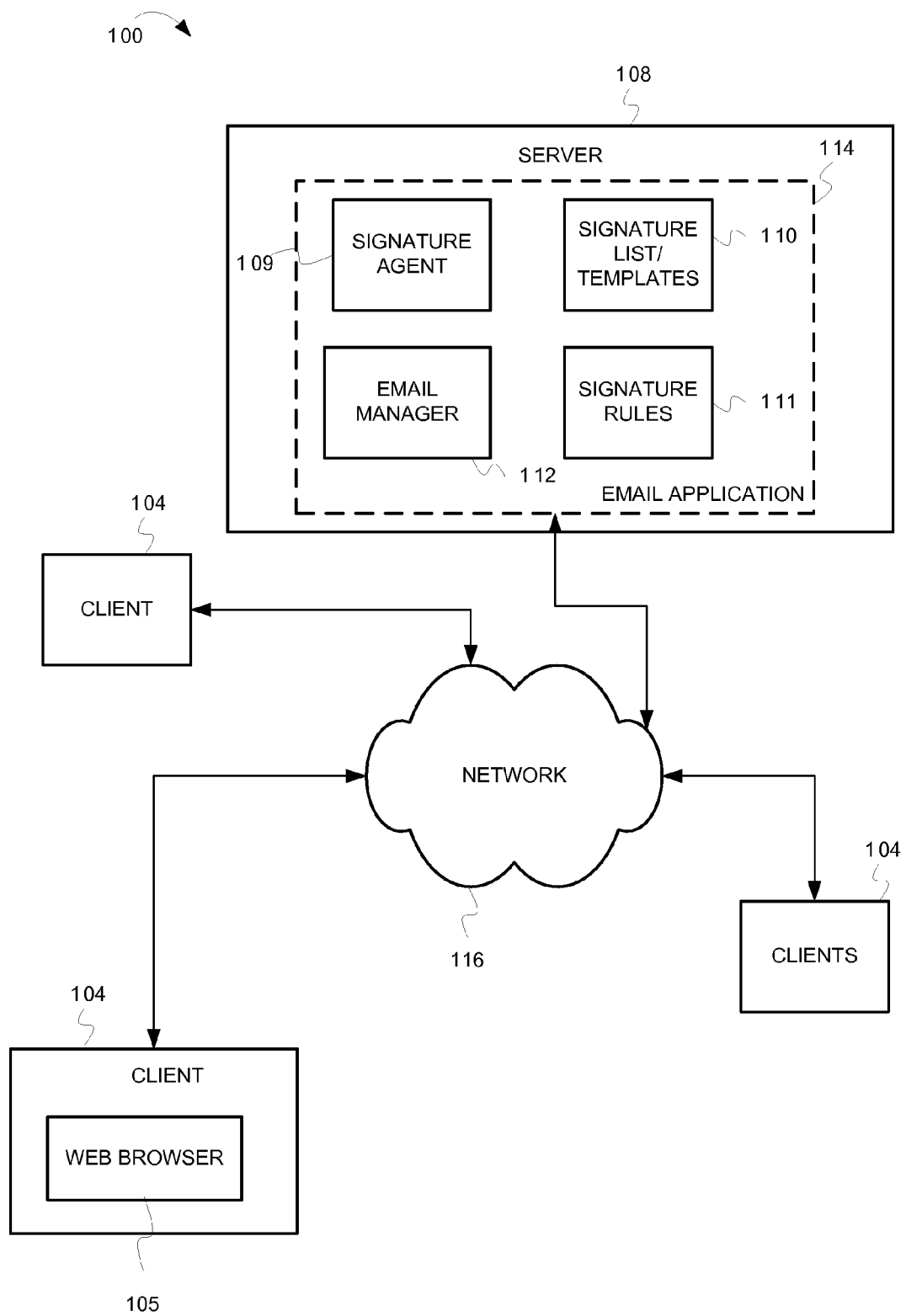
FIG. 1 is a block diagram illustrating a client-server system configured to determine and append an appropriate email signature based on signature rules, according to some embodiments of the invention.

FIG. 1 is a block diagram illustrating a client-server system configured to determine and append an appropriate email signature based on signature rules, according to some embodiments of the invention.

As shown in FIG. 1, the system 100 includes a server 108 and clients 104. The server 108 includes an email application 114 including a signature agent 109, a signature list (and/or signature templates) 110, an email manager 112, and a rule repository 111 including rules for choosing appropriate signatures. The clients 104 can be in the form of personal computers, cell phones, personal digital assistants (PDAs), laptops etc. The clients can use browsers 105 or any other software for sending and receiving messages.

In some embodiments, the server 108 enables the clients 104 to read and access emails, append signatures, store email drafts, and perform other email related operations. The client 104 can use a web browser 105 to interface with the server and display messages and other information to the user. Typically, users can type emails in the email web browser 105 and activate signature features by clicking on GUI buttons in the web browser 105. The web browser 105 can communicate the request for a signature to the server 108 along with the email message content. In some instances, the signature request can include special information, such as special calendar events (e.g., birthdays), personal information, etc. In some instances, the server's signature agent 109 procures the special events from a calendar application (not shown) associated with the email application 114, or from other applications (e.g., on other servers). In turn, at the server 108, the signature agent 109 can determine properties of the email (e.g., date/time), properties of the sender and receiver (e.g., email address), etc. The signature agent 109 can also determine general conditions from the system (e.g., time of day).

The signature agent 109 can identify the sender's username and locate signature rules 111 created by the sender. The signature agent 109 can compare the email's properties with the signature rules 111, determine a signature to append to the email, access the repository of signatures (110), locate the appropriate signature, and append the signature to the message. The email manager 112 can send the message along with the appended signature to the client 104 for display on the web browser 105 (e.g., for the user's approval). Upon approval, the email manager 112 can send the message including the signature to a recipient. In some embodiments, the email manager does not solicit user approval before sending the email to the recipient.

The server 108 and the clients 104 can be any suitable computing devices capable of executing software in accordance with the embodiments described herein. Any one of these devices can be embodied as the computer system described in FIG. 2.

The servers 108 and the clients 104 are connected to a communication network 116. The network 116 can include any technology suitable for passing communication between the clients and servers (e.g., Ethernet, 802.11n, SONET, etc.). Moreover, the network 116 can be part of other networks, such as cellular telephone networks, public-switched telephone networks (PSTN), cable television networks, etc.

Standalone System

Figure 2:
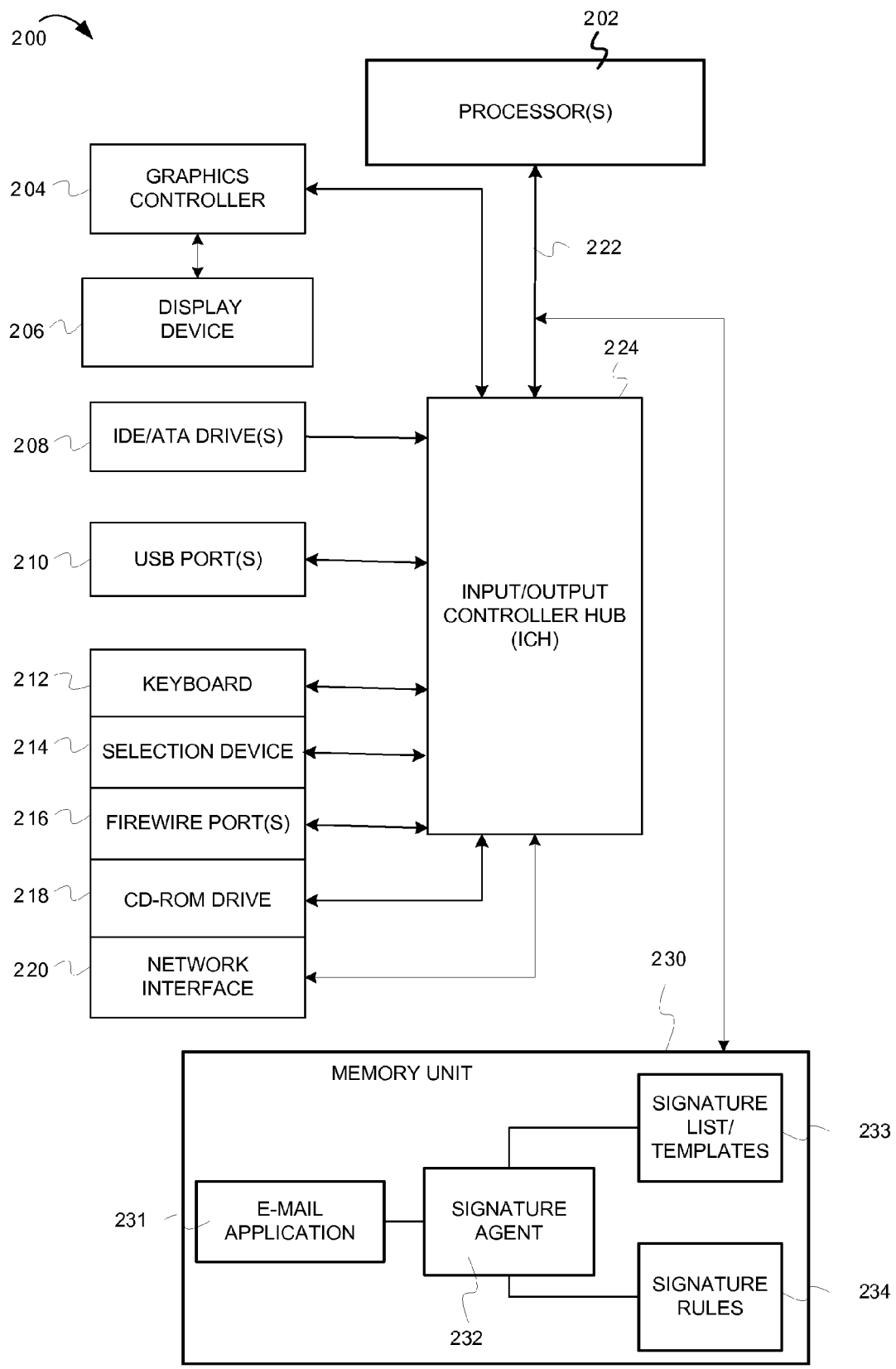
FIG. 2 is a block diagram illustrating a computer system configured to identify and append an appropriate email signature, according to some embodiments of the invention.

FIG. 2 is a block diagram illustrating a computer system configured to identify and append an appropriate email signature, according to some embodiments of the invention. The computer system 200 can be configured to operate similar to the server shown in FIG. 1. The computer system 200 includes a processor 202. The processor 202 is connected to an input/output controller hub 224 (ICH) also known as a south bridge. A memory unit 230 interfaces with the processor 202 and the ICH 224. The main memory unit 230 can include any suitable random access memory (RAM), such as static RAM, dynamic RAM, synchronous dynamic RAM, extended data output RAM, etc.

In one embodiment, the memory unit 230 includes an email application 231, a signature agent 232, a signature list (and/or signature templates) 233, and signature rules 234 for choosing appropriate signatures for various emails. The signature agent 232 can determine properties of email (e.g., email content), properties of the sender and receiver (e.g., users associated with email addresses), general conditions from the system (e.g., time of day), etc. The signature rules 234 include a set of user defined policies. The signature agent 232 can compare the email properties with the signature rules 234 to determine an appropriate signature. The signature agent 232 can also access the signature rule repository 233, select the appropriate signature according to the signature policies, and append the signature to the email message.

For example, a user may type an email during the Christmas season. The signature agent 232 can interface with a system clock (not shown) and determine that the email is being sent in December, a few days before Christmas. A policy in the signature rules 234 may indicate that emails sent during the Christmas season should be appended with a signature including a spirited Christmas greeting. In some instances, the policies may also contain a reference or link to the corresponding signature in the signature repository 234. The signature agent 232 can locate the Christmas signature, append it to the email message, and send the email to a recipient.

In some embodiments, the signature list 233 and signature rules 234 can also reside on other forms of machine-readable medium such as flash RAM devices, CD-ROM, magneto-optical storage medium, erasable programmable memory (e.g., EPROM and EEPROM), or other types of medium suitable for storing electronic instructions and data.

The ICH 224 connects and controls peripheral devices. In FIG. 2, the ICH 224 is connected to IDE/ATA drives 208 (used to connect external storage devices) and to universal serial bus (USB) ports 210. The ICH 224 may also be connected to a keyboard 212, a selection device 214, firewire ports 216 (for use with video equipment), CD-ROM drive 218, and a network interface 220. The ICH 224 can also be connected to a graphics controller 204. The graphics controller is connected to a display device (e.g., monitor).

In some embodiments, the computer system 200 can include additional devices and/or more than one of each component shown in FIG. 2 (e.g., video cards, audio cards, peripheral devices, etc.). For example, in some instances, the computer system 200 may include multiple processors, multiple cores, multiple external CPU's. In other instances, components may even be integrated or subdivided. In addition, embodiments may be embodied in an electrical, optical, acoustical or other form of propagated signal (e.g., carrier waves, infrared signals, digital signals, etc.), or wireline, wireless, or other communications medium.

Any component of the computer system 200 (and any component of the system shown in FIG. 1) can be implemented as hardware, firmware, and/or machine-readable media including instructions for performing the operations described herein. A machine-readable medium includes any mechanism for storing or transmitting information in a form (e.g., software, processing application) readable by a machine (e.g., a computer system). Examples of machine-readable storage media include read only memory (ROM), random access memory (RAM), magnetic disk storage media, optical storage media, flash memory machines, etc. Examples of machine-readable signal propagation media include any media suitable for transmitting software over a network.

Example Operations

This section describes operations associated with some embodiments of the invention. The flow diagram will be described with reference to the architectural block diagrams presented above. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
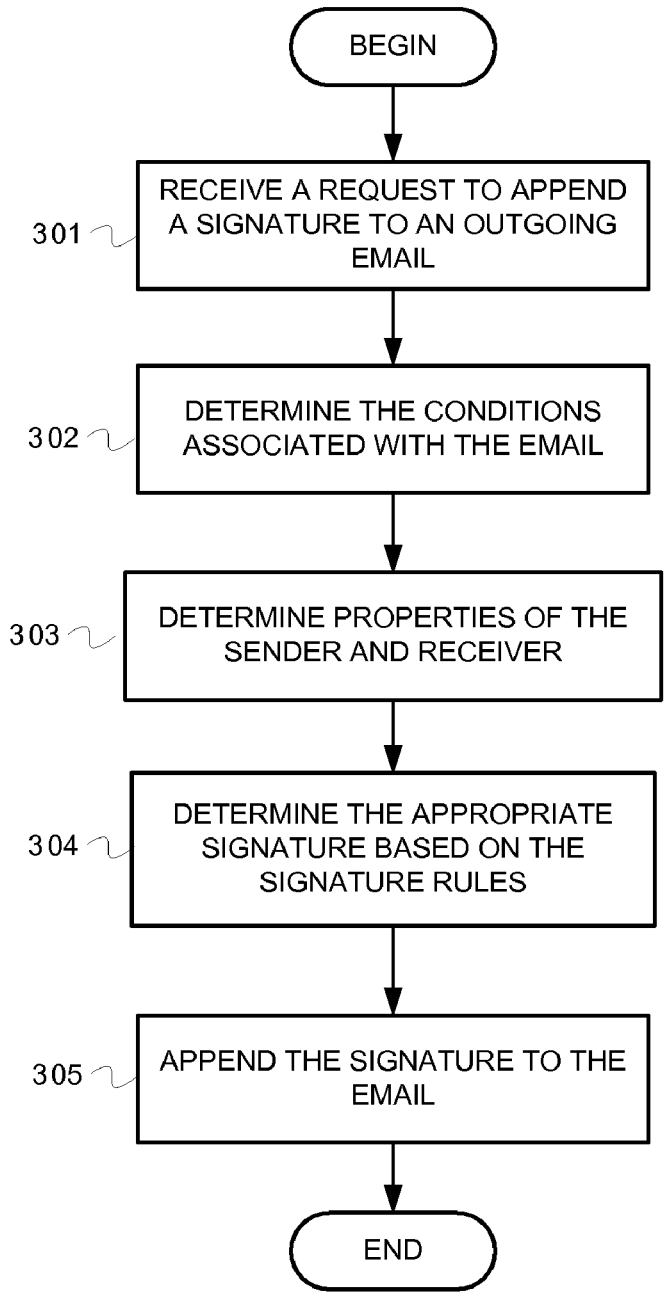
FIG. 3 is a flow diagram illustrating operations for determining properties of an email and appending a signature, according to some embodiments of the invention.

FIG. 3 is a flow diagram illustrating operations for determining properties of an email and appending a signature, according to some embodiments of the invention. The following discussion will describe the flow 300 with reference to the client-server system described in FIG. 1. The flow 300 begins at block 301.

At block 301, the signature agent 109 receives a request to append a signature to an outgoing email. This request can arise from a user activating GUI controls that prompt the email manager 112 to append a signature to one or more email messages. In some instances, the email application 114 can also be configured to automatically append a signature to every outgoing email. This operation is further illustrated in FIG. 4.

Figure 4:
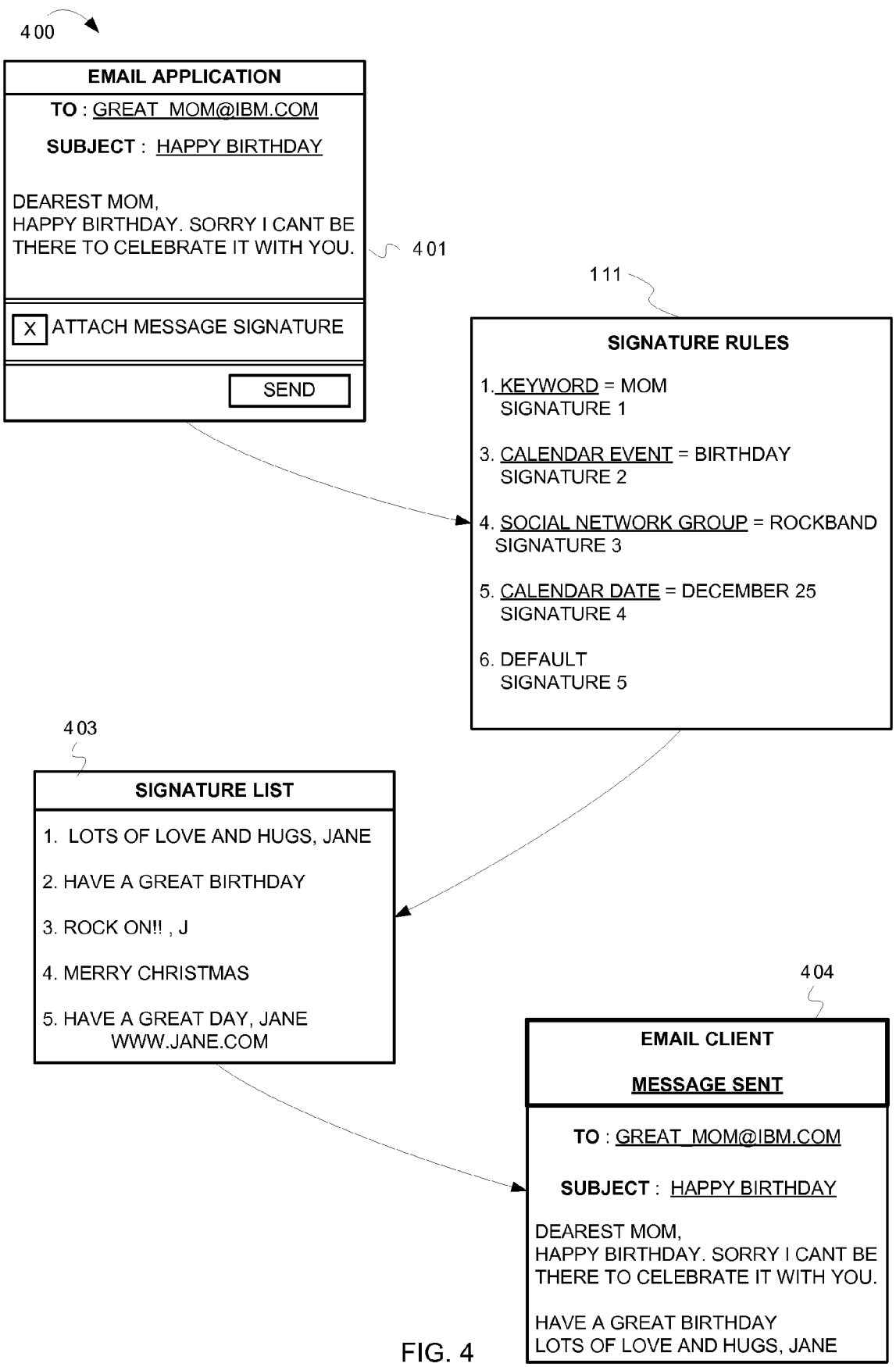
FIG. 4 is a conceptual diagram illustrating concepts associated with appending a signature to an email message, according to some embodiments of the invention.

FIG. 4 is a conceptual diagram illustrating concepts associated with appending a signature to an email message, according to some embodiments of the invention. In FIG. 4, the screenshot 401 shows how a user can enable the signature feature of an email application. As shown in the screenshot 401, the user can type an email message to her mother and check a box indicating that a signature should be appended to the email message. In some embodiments, the user types the email message and enables the signature feature from a web browser 105 (see FIG. 1). The web browser 105 can transmit, to the email application 114, the request to enable the signature feature. In some instances, the email application 114 can also send additional information, such as the message content, calendar events, date, time, sender's email address, etc. Referring back to FIG. 3, the flow continues at block 302.

At block 302, the signature agent 109 determines conditions associated with the email message. For example, the signature agent 109 can determine when the email message was created and the current date and time. In other instances, the signature agent 109 may interface with a calendaring system (e.g., residing on the server 108, client 104, or other device) to determine appointments, special occasions, holidays, etc. associated with the email message. The signature agent 109 can also scan the text of the email message. In some instances, the signature agent 109 can use a weighting system to put more emphasis on text in the subject line or on certain words in the body of the email message. The signature agent 109 can use any of this information in determining conditions associated with the email. The flow continues at block 303.

At block 303, the signature agent 109 determines properties associated with the sender and recipient. In some instances, the signature agent 109 can interface with user profile information (e.g., from social networking websites, email profiles, etc.) to determine the sender's relationship to the recipient, the recipient's birthday, anniversary, and other special occasions associated with the sender and recipient. Properties of the recipient may also include location of the recipient, social affiliations, group memberships, etc. In FIG. 3, the flow continues at block 304.

At block 304, the signature agent 109 determines the appropriate signature based on the signature rules. The signature agent 109 can accesses the repository of signature rules 111 and use the properties of the email to determine the most appropriate signature for the specified message. As shown in FIG. 4, the signature rules 111 enable the signature agent 109 to choose signatures based on keywords, calendar events, social network groups, and calendar date. In some instances, the signature rules 111 can indicate that signatures are selected based on other information, such as weather, time of day, holidays, special occasions, etc. In some instances, the signature rules 111 can indicate that different signatures be appended for different people in a group. Thus, for a single email addressed to multiple recipients, each recipient may receive a different signature in the email. For example, a sender may want to send one email to a colleague from work and also to a friend outside of work. The signature agent 109 can append a signature including links to internal websites in the colleague's email, while appending the friend's email with a signature including a private joke. Thus, both recipients may receive identical messages but different signatures. Signatures can also change depending on the season. For example, the signature agent 109 might query a system calendar to determine the month of the year and season. The signatures appended to emails during fall might have references to falling leaves, whereas signatures during winter might have references to snow and Christmas. Additionally, the user can group friends and contacts in numerous ways, based on the recipient's role in an organization, age, religious preferences, etc. The user may also choose to have a default signature to append to messages when the signature agent cannot determine any specific properties (see signature rules 111 in FIG. 4).

In FIG. 4, the email along with the user's request to append a signature is sent to the server 108. Each of the signature rules is associated with one or more signatures (see signature list 403). For instance, if the email is being sent on Christmas, a signature saying "Merry Christmas" is selected. On the other hand, if the email is being sent to a friend on their birthday (as determined by signature agent interfacing with the user's calendaring system), a signature saying "Have a great birthday" can be appended. The signature agent 109 can check these keywords, events, or occasions against the signature policies 111 to select the appropriate signature. Referring back to FIG. 3, the flow continues at block 305.

At block 305, the signature agent 209 appends the signature to the email. The signature agent 109 retrieves the appropriate signature (i.e., the signature selected at 304) from a list of signatures 110 and appends this signature to the original message. In some embodiments, two or more signatures can be joined together to form the final signature that is appended to the email. In some embodiments, the email manager 112 sends the message and the appended signature to the web browser 105 for the user's approval. Upon approval, the email manager 112 can send the message including the signature to a recipient. This is illustrated in FIG. 4, where the final message 404 contains two signatures from the signature list 403. In some instances, the signatures can also be parts of a set of templates. Different parts of different templates can be pieced together to form the final signature. Signature templates are useful if the user wants to reuse parts of the signature and add or remove sections specific to a user or group of users. In FIG. 3, after the signature agent 109 appends the appropriate signature to the email, the flow comes to an end.

CONCLUSION

While the embodiments are described with reference to various implementations and exploitations, these embodiments are illustrative and that the scope of the inventive subject matter is not limited to them. In general, techniques for automatically choosing the appropriate message signature based on contextual cues are described herein and may be implemented with facilities consistent with any hardware system or hardware systems. Many variations, modifications, additions, and improvements are possible.

In some instances, structure and functionality presented as separate components in example configurations may be implemented with combined structures or components. Similarly, structures and functionality presented as a single component may be implemented as separate components. These and other variations, modifications, additions, and improvements may fall within the scope of the inventive subject matter. Finally, boundaries between various components, operations, and data stores are somewhat arbitrary, and particular operations are illustrated in the context of specific illustrative configurations. Other allocations of functionality are envisioned and may fall within the scope of the inventive subject matter.

What is claimed is:

1. A method comprising:
   detecting a request to append a signature to an outgoing email, wherein the outgoing email is addressed from a sender to a recipient;
   accessing a plurality of email signature rules for the sender;
   evaluating at least one of a condition and a property associated with the outgoing email against the plurality of email signature rules;
   determining that at least two of the plurality of email signature rules are satisfied based on said evaluating the at least one of the condition and the property associated with the outgoing mail against the plurality of email signature rules;
   identifying, from a list of email signatures, a plurality of email signatures based, at least in part, on the at least two email signature rules that are satisfied;
   generating a composite signature with the plurality of email signatures; and
   appending the composite signature to the outgoing email.

2. The method of claim 1, wherein said evaluating the at least one of the condition and the property associated with the outgoing email against the plurality of email signature rules comprises comparing text in the outgoing email to text included in the plurality of email signature rules.

3. The method of claim 1, wherein said evaluating the at least one of the condition and the property associated with the outgoing email against the plurality of email signature rules comprises at least one of:
   determining one or more temporal conditions associated with the outgoing email; and
   determining one or more social relationships associated with the recipient.

4. The method of claim 3, wherein:
   said evaluating the at least one of the condition and the property associated with the outgoing email against the plurality of email signature rules comprises comparing the plurality of email signature rules to the one or more temporal conditions and the one or more social relationships, and
   said determining that the at least two of the plurality of email signature rules are satisfied is based, at least in part, on said comparing the plurality of email signature rules to the one or more temporal conditions and the one or more social relationships.

5. The method of claim 3, wherein the condition associated with the outgoing email comprises the one or more temporal conditions associated with the outgoing email including one or more of a date and time at which the email is sent, holidays, seasons, time of day, meeting times, and events in a calendar associated with the sender.

6. The method of claim 3, wherein the property associated with the outgoing email comprises the one or more social relationships associated with the recipient including one or more of the recipient's relationship to the sender, and a social group with which the recipient is involved.

7. The method of claim 1 further comprising identifying a first signature from the list of signatures that corresponds to a second recipient of the outgoing email and appending the first signature to the outgoing email for the second recipient, wherein the outgoing email is also addressed to the second recipient, wherein the first signature is different than the plurality of signatures.

8. An apparatus for determining and appending an appropriate email signature, the apparatus comprising:
   a processor;
   an email client configured to send and receive messages; and
   an email signature agent configured to:
      detect a request to append a signature to an outgoing email, wherein the outgoing email is addressed from a sender to a recipient;
      access a plurality of email signature rules for the sender;
      evaluate at least one of a condition and a property associated with the outgoing email against the plurality of email signature rules;
      determine that at least two of the plurality of email signature rules are satisfied based on the email signature agent evaluating the at least one of the condition and the property associated with the outgoing mail against the plurality of email signature rules;
      identify, from a list of email signatures, a plurality of email signatures based, at least in part, on the at least two email signature rules that are satisfied;
      generate a composite signature with the plurality of email signatures; and
      append the composite signature to the outgoing email.

9. The apparatus of claim 8, wherein the email signature agent being configured to evaluate the at least one of the condition and the property associated with the outgoing email against the plurality of email signature rules comprises the email signature agent being configured to compare text in the outgoing email to text included in the plurality of email signature rules.

10. The apparatus of claim 8, wherein the email signature agent configured to evaluate the at least one of the condition and the property associated with the outgoing email against the plurality of email signature rules comprises at least one of:
   the email signature agent being configured to determine one or more temporal conditions associated with the outgoing email; and
   the email signature agent being configured to determine one or more social relationships associated with the recipient.

11. The apparatus of claim 10, wherein the property associated with the outgoing email comprises the one or more social relationships associated with the recipient including one or more of the recipient's relationship to the sender, and a social group with which the recipient is involved.

12. The apparatus of claim 8, wherein the email signature agent is further configured to identify a first signature, from the list of signatures, that corresponds to a second recipient of the outgoing email and to append the first signature to the outgoing email for the second recipient, wherein the outgoing email is also addressed to the second recipient, wherein the first signature is different than the plurality of signatures.

13. The apparatus of claim 10, wherein the condition associated with the outgoing email comprises the one or more temporal conditions associated with the outgoing email including one or more of a date and time at which the email is sent, holidays, seasons, time of day, meeting times, and events in a calendar associated with the sender.

14. The apparatus of claim 10, wherein:
   the email signature agent configured to evaluate the at least one of the condition and the property associated with the outgoing email against the plurality of email signature rules comprises the email signature agent configured to compare the plurality of email signature rules to the one or more temporal conditions and the one or more social relationships, and
   the email signature agent configured to determine that the at least two of the plurality of email signature rules are satisfied is based, at least in part, on the email signature agent comparing the plurality of email signature rules to the one or more temporal conditions and the one or more social relationships.

15. One or more non-transitory machine-readable storage media having stored therein a program product, which when executed a set of one or more processor units causes the set of one or more processor units to perform operations that comprise:
   detecting a request to append a signature to an outgoing email, wherein the outgoing email is addressed from a sender to a recipient;
   accessing a plurality of email signature rules for the sender;
   evaluating at least one of a condition and a property associated with the outgoing email against the plurality of email signature rules;
   determining that at least two of the plurality of email signature rules are satisfied based on said evaluating the at least one of the condition and the property associated with the outgoing mail against the plurality of email signature rules;
   identifying, from a list of email signatures, a plurality of email signatures based, at least in part, on the at least two email signature rules that are satisfied;
   generating a composite signature with the plurality of email signatures; and
   appending the composite signature to the outgoing email.

16. The one or more non-transitory machine-readable storage media of claim 15, wherein said operation of evaluating the at least one of the condition and the property associated with the outgoing email against the plurality of email signature rule comprises:
   comparing text in the outgoing email to text included in the plurality of email signature rules.

17. The one or more non-transitory machine-readable storage media of claim 15, wherein said operation of evaluating the at least one of the condition and the property associated with the outgoing email against the plurality of email signature rules further comprises at least one of:
   determining one or more temporal conditions associated with the outgoing email; and
   determining one or more social relationships associated with the recipient.

18. The one or more non-transitory machine-readable storage media of claim 17, wherein the condition associated with the outgoing email comprises the one or more temporal conditions associated with the outgoing email including one or more of a date and time at which the email is sent, holidays, seasons, time of day, meeting times, and events in a calendar associated with the sender.

19. The one or more non-transitory machine-readable storage media of claim 17, wherein the property associated with the outgoing email comprises the one or more social relationships associated with the recipient including one or more of the recipient's relationship to the sender, and a social group with which the recipient is involved.

20. The one or more non-transitory machine-readable storage media of claim 15, wherein the operations further comprise identifying a first signature, from the list of signatures, that corresponds to a second recipient of the outgoing email and appending the first signature to the outgoing email for the second recipient, wherein the outgoing email is also addressed to the second recipient, wherein the first signature is different than the plurality of signatures.

* * * * *